(12) United States Patent
Kramer, Jr. et al.

(10) Patent No.: US 8,925,591 B2
(45) Date of Patent: Jan. 6, 2015

(54) AXIALLY COMPRESSIBLE FLEXIBLE TUBING AND METHOD FOR MAKING SAME

(75) Inventors: Vance M. Kramer, Jr., Perrysburg, OH (US); Jonathan O. Rodebaugh, Toledo, OH (US)

(73) Assignee: Crushproof Tubing Co., McComb, OH (US)

( * ) Notice: Subject to any disclaimer, the term of this patent is extended or adjusted under 35 U.S.C. 154(b) by 1255 days.

(21) Appl. No.: 12/778,722

(22) Filed: May 12, 2010

(65) Prior Publication Data

US 2011/0277865 A1 Nov. 17, 2011

(51) Int. Cl.
*F16L 11/00* (2006.01)
*B29C 53/30* (2006.01)
*F16L 11/11* (2006.01)
*B29K 21/00* (2006.01)
*B29K 105/24* (2006.01)
*B29L 23/18* (2006.01)

(52) U.S. Cl.
CPC .............. *B29C 53/305* (2013.01); *F16L 11/111* (2013.01); *B29K 2021/00* (2013.01); *B29K 2105/246* (2013.01); *B29L 2023/18* (2013.01)
USPC .......................................... 138/122; 138/121

(58) Field of Classification Search
USPC ................................................. 138/121, 122
See application file for complete search history.

(56) References Cited

U.S. PATENT DOCUMENTS

| | | | |
|---|---|---|---|
| 2,299,520 A * | 10/1942 | Yant | 264/294 |
| 2,832,086 A | 4/1958 | Wells | |
| 2,888,712 A | 6/1959 | Kramer et al. | |
| 2,891,581 A * | 6/1959 | Roberts | 138/121 |
| 3,234,969 A * | 2/1966 | Du Mont | 138/121 |
| 3,486,532 A * | 12/1969 | Sawada | 138/122 |
| 3,493,251 A * | 2/1970 | Kramer | 285/260 |
| 3,714,311 A * | 1/1973 | Stefanka | 264/507 |
| 3,908,704 A * | 9/1975 | Clement et al. | 138/121 |
| 4,000,341 A * | 12/1976 | Matson | 428/36.9 |
| 4,113,828 A * | 9/1978 | Kramer et al. | 264/294 |
| 4,865,362 A * | 9/1989 | Holden | 285/260 |
| 5,132,073 A * | 7/1992 | Nielsen | 264/506 |
| 5,435,962 A * | 7/1995 | Kramer, Jr. | 264/507 |
| 5,560,396 A * | 10/1996 | Kramer, Jr. | 138/109 |
| 5,676,176 A * | 10/1997 | Usui | 138/121 |
| 6,102,078 A * | 8/2000 | Kramer, Jr. | 138/122 |
| 2006/0191585 A1 * | 8/2006 | Mori | 138/121 |
| 2008/0203324 A1 * | 8/2008 | Fujimura et al. | 250/492.23 |

* cited by examiner

*Primary Examiner* — James Hook
(74) *Attorney, Agent, or Firm* — Rankin, Hill & Clark LLP

(57) ABSTRACT

A length of flexible helically corrugated rubber tubing is provided with certain characteristics that enable it to be axially compressed to less than half of its normal relaxed length using minimal force while still providing a high resistance to crushing. The tubing has a wall with a uniform thickness, the wall defining external and internal threads with a specially defined pitch and thread height related to the wall thickness.

11 Claims, 3 Drawing Sheets

AXIALLY COMPRESSIBLE FLEXIBLE TUBING AND METHOD FOR MAKING SAME

BACKGROUND OF INVENTION

1. Field of Invention

The present invention relates to crush-resistant flexible tubing for conveying gases. The tubing is formed of elastomeric material that initially is in an uncured condition and, when formed and cured, provides a strong but flexible length of tubing. More particularly, the invention relates to tubing that has helical corrugations along its length and also, relates to a method for making the tubing.

2. Description of Related Art

Corrugated tubing of the general type to which the invention relates is both flexible and strong, yet still retains its tubular form in a semi-rigid condition. This is accomplished by providing the tubing with helical corrugations. This type of tubing is used in a variety of home and industrial applications, such as for vacuum cleaning systems, engine exhaust systems for automotive service facilities and for numerous other purposes.

In accordance with prior practice, helically corrugated tubing may be made by first sliding an extruded sleeve of uncured rubber axially over a rotatable mandrel, the mandrel having a continuous thread formed on its outer surface. When in place on the mandrel, the sleeve is forced into the helical groove or root of the thread by a length of cord wrapped around the sleeve as the sleeve rotates with the mandrel. This serves to impart a desired corrugated shape to the uncured rubber sleeve.

The resulting assembly is then removed from its rotary support preparatory to curing. In this condition the rubber sleeve is cured in an oven or autoclave to set the helical corrugations. The result is a cured length of rubber tubing with helical convolutions.

The cord is removed from the corrugated tubing by placing the assembly back on a rotary support and rotating the mandrel in the reverse direction while unwinding the cord from the cured tube. After the removal of the cord, the corrugated tube length may be removed from the mandrel by introducing air under pressure between the outer surface of the mandrel and the inner surface of the corrugated tube. The overall method described above is generally known as the "cording" process and is shown and described in more detail in U.S. Pat. No. 2,832,086. The process of removing the cured tube from the mandrel using pressurized air is shown and described in U.S. Pat. No. 2,888,712.

The resulting tubular product with helical convolutions is both flexible and resilient but rigid enough to resist crushing such as when the tube is stepped on. Also, the tube has wall with a generally uniform thickness, the wall defining continuous internal and external threads with alternating crests and roots along the tube length. In other words, the wall portion that defines a crest portion of the external thread also defines on its opposite side, the root portion of the internal thread.

As viewed in longitudinal or axial section, the wall has a sinusoidal form with alternating crests and roots as to both the internal and external surface portions. Both the internal and external crests are rounded or semi-circular as viewed in longitudinal section and have about the same shape (i.e. about the same radius). Likewise, both the internal and external roots are rounded or semi-circular as viewed in longitudinal section and have about the same shape (i.e. about the same radius). However, the radii of the external and internal crests are greater than the radii of the respective roots, the difference being about equal to the thickness of the tubular wall.

Also, in past practice, the sinusoidal shape of the wall as viewed in axial section is such that the center of the semi-circular crest shape for the outer surface has about the same radial distance from the axis of the tube as the center of the semi-circular crest shape for the inner surface. In order to achieve this characteristic for the tubing, the thread has a very small pitch that is achieved by having a minimal spacing between the convolutions of the cord when the tube is formed on the rotating mandrel. These related characteristics result in a high resistance to axial compression of the tube. At the same time, these characteristics produce a high resistance to crushing.

While resistance to axial compression is desirable for many applications, there are some circumstances where it would be desirable to be able to axially compress crush-resistant flexible tubing for conveying gases with minimal force and retain it in a collapsed condition (e.g., for storage and transport). One application where axial shortening or compression of the corrugated tubing would be beneficial, if not essential, is in the case of mobile military field equipment. In modern combat operations, it is necessary to be prepared for chemical and/or biological attack. With certain current types of biochemical weapons, gas masks alone would not protect against casualties. In the case of some biochemical agents, any contact with the body could disable the soldier.

Accordingly, to protect against biochemical warfare, military vehicles must have air purification equipment to provide safe air to the vehicle's occupants. Also, sealed enclosures (e.g. tents) with air purification capability are needed. To achieve this, it is necessary to have means to connect either a vehicle's own air purification system or a separate mobile air purification unit to an adjacent sealed enclosure. Flexible corrugated tubing of the general type described above is ideally suited for this purpose, provided it may be axially compressed with minimal force to reduce its size for storage and transport. This is particularly important in the case of combat vehicles and other mobile combat equipment because space is at a premium.

Accordingly creative modifications to the design and production of helically corrugated tubing using the "cording" process have been developed to meet the requirements described above. The tubing and process for making it as embodied in the present invention achieve these results and afford other features and advantages heretofore not obtainable.

BRIEF SUMMARY OF THE INVENTION

In accordance with the invention, crush resistant helically corrugated tubing is provided with certain dimensional characteristics to enable the tubing to be axially compressed while still retaining a high resistance to crushing. More particularly, the tubing so formed, is axially compressible from its normal relaxed length to a collapsed condition that is from about 20% to about 80%, and in some embodiments from about 50% to about 75%, shorter than its normal length upon application of a load of about 25 lbs. Thus, the ratio of a length of tubing in a normal relaxed state compared to a length of the same tubing in an axially compressed state will range from about 5:1 to about 1.25:1, and in some embodiments, from about 4:1 to about 2:1. The force needed to compress the tubing is relatively small and can easily be applied by an average person.

The tubing has a wall with a uniform thickness, the wall defining a continuous external thread with an external crest and root and a corresponding continuous internal thread with an internal crest and root. The size of the convolution must be larger than the size of convolutions utilized in prior art tubing. In one embodiment, the thread has a pitch of about six to ten times the wall thickness and a thread height, from root to crest, of about three to five times the wall thickness. The utilization of larger convolutions provide the desired axial compressibility while still maintaining resistance to crushing.

In accordance with the method of the invention, helically corrugated tubing having the above described characteristics is made by first sliding an extruded sleeve of uncured rubber axially over a rotatable mandrel. The mandrel has continuous thread with a crest and root, formed on its outer surface sufficient to produce a convolution of sufficient size to allow for axial compressibility. In one embodiment, the thread has a pitch of about six to ten times the wall thickness of the extruded sleeve and a thread height from root to crest of about three to five times the wall thickness. When in place on the mandrel, the sleeve is forced into the helical root of the thread by a length of cord wrapped around the sleeve as the sleeve rotates with the mandrel.

The resulting assembly is placed in an oven to cure the rubber sleeve and set helical corrugations. The assembly is then removed from the curing oven and the cord is removed from the cured rubber tubing by reverse rotation of the mandrel. Finally, the cured rubber tubing is removed from the mandrel using techniques well known in the art and as described above.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
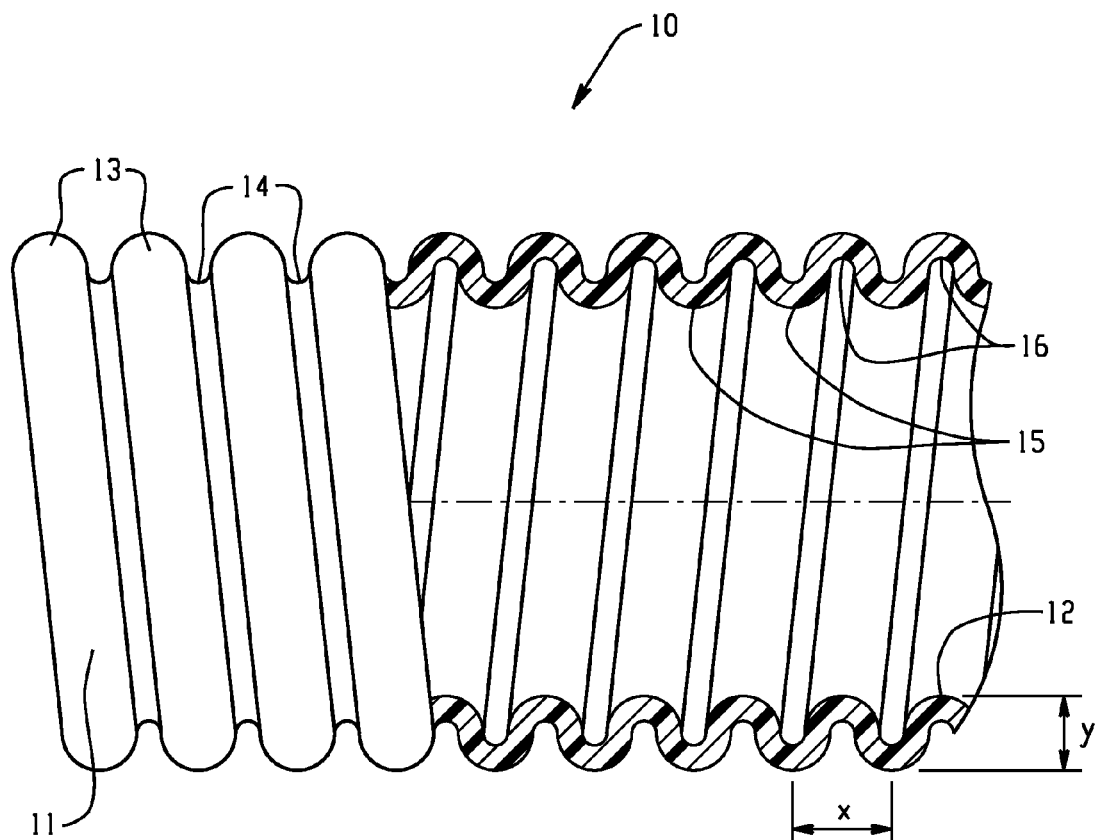
FIG. 1 is a fragmentary side elevation of a length of helically corrugated rubber tubing of prior art design, produced in accordance with the prior art "cording" method, with a portion broken away and shown in section for the purpose of illustration.

Referring more particularly to the drawings, FIG. 1 shows a portion of a length of helically corrugated, crush resistant rubber tubing 10 of the type incorporating a prior art design. The tubing 10 may be formed of many different types of elastomers. This design represents the type of tubing produced by the prior art "cording" method described above. The tubing typically has an inner diameter of from 3 to 6 inches but the other dimensions of the helical convolutions would be about the same for a variety of sizes. The tubing 10 is both flexible and resilient but is rigid enough to resist crushing such as when the tubing is stepped on.

The tubing 10 has a wall with a uniform thickness, the wall being shaped to define a continuous external thread 11 and a corresponding continuous internal thread 12. The external thread 11 has a crest 13 and a root 14 while the internal thread 12 has a crest 15 and root 16. The portion of the tubular wall that defines the crest 13 for the external thread 11 also defines, on its opposite side, the root 16 of the internal thread 12. Likewise, the portion of the tubular wall that defines the crest 15 for the internal thread 12 also defines on its opposite side, the root 14 of the external thread 11.

As shown in FIG. 1, the wall of the tubing as viewed in a longitudinal (or axial) section has a sinusoidal form, with alternating crests and roots. Both the external and internal crests are rounded, as are the external and internal roots. However, the radii of the external and internal crests 13 and 15 are greater than the radii of the respective roots 14 and 16.

The pitch (i.e., distance from one helical convolution to the next) as designated in FIG. 1 by the letter "x", is relatively small. In some applications, the pitch of the threads for helically corrugated tubing of the prior art is about four times the wall thickness or about the pitch shown in FIG. 1. Also, the typical height of the external and internal threads (i.e., the distance from root to crest) as designated in FIG. 1 by the letter "y", is relatively small. In some applications, the height of the external and internal threads is about twice the wall thickness. These parameters are used to provide optimal resistance to crushing. However, these parameters also result in corrugated tubing with a high resistance to axial compression. Normally, such tubing can be axially compressed from its normal relaxed length to a collapsed condition by only a small amount (e.g. <15% under a 25 lb. load).

Figure 2:
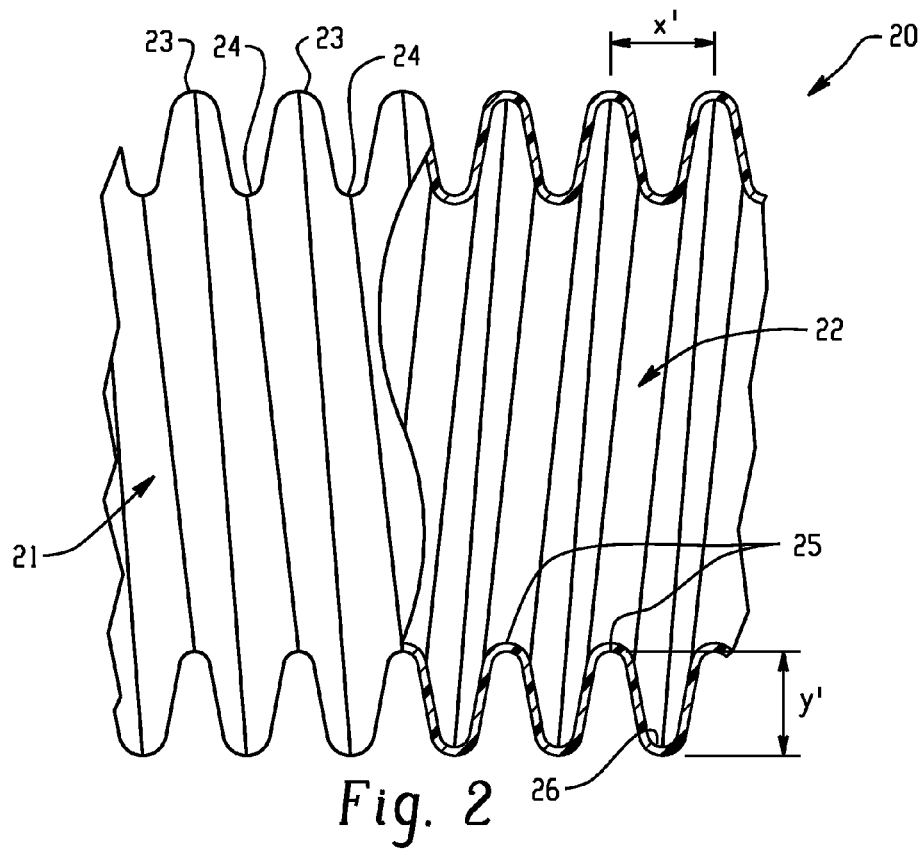
FIG. 2 is a fragmentary side elevation of a length of helically corrugated rubber tubing embodying the invention and showing the tubing in its normal relaxed condition and with one portion broken away and shown in section for the purpose of illustration.
Figure 3:
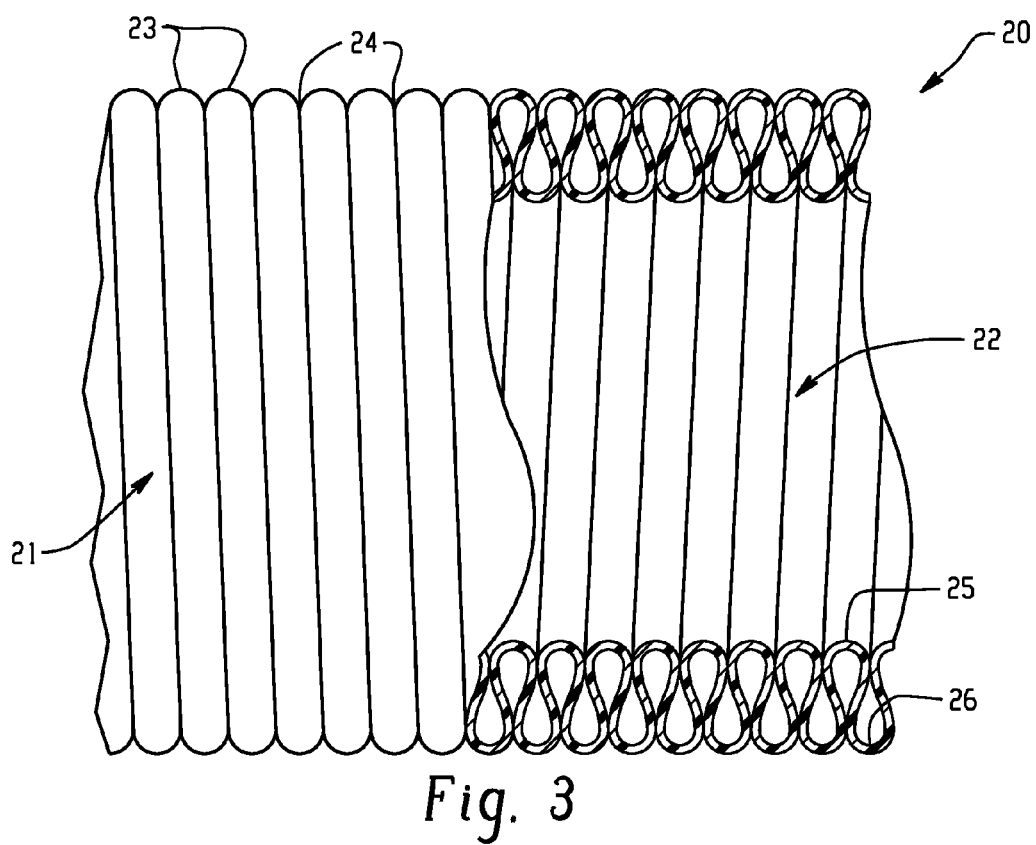
FIG. 3 is a fragmentary side elevation of the length of tubing of FIG. 2, showing the tubing axially compressed to a substantially shortened length and with a portion broken away and shown in section for the purpose of illustration.

FIGS. 2 and 3 show a portion of a length of helically corrugated rubber tubing 20 embodying the invention, the tubing being so formed as to permit substantial axial compression unlike the prior art tubing of FIG. 1, while still maintaining an acceptably high resistance to crushing. FIG. 2 shows the tubing 20 in its normal relaxed condition, while FIG. 3 shows the tubing of FIG. 2 in its axially compressed condition, a condition that may be achieved in accordance with the unique characteristics provided by the invention. The tubing 20 may be formed from a variety of different elastomers. Butyl rubber is particularly suitable for military applications since it is impermeable to the types of gases used in chemical warfare.

The tubing 20 has a wall with a uniform thickness, the wall being shaped to define a continuous external thread 21 and a corresponding continuous internal thread 22. The external thread 21 has a crest 23 and a root 24, while the internal thread 22 has a crest 25 and a root 26. The portion of the tubular wall that defines the crest 23 for the external thread 21 also defines, on its opposite side, the root 26 for the internal thread 22. Likewise, the portion of the tubular wall that defines the crest 25 of the internal thread 22 also defines, on its opposite side, the root 26 of the external thread.

As shown in FIG. 2, the wall of the tubing, as viewed in longitudinal (or axial) section, has a sinusoidal form similar to that shown in FIG. 1, however, the convolutions are significantly larger in size. In the embodiment of the invention illustrated in FIG. 2, the pitch of the convolutions is designated by the letter "x", and is about eight times the wall thickness and the thread height is designated by the letter "y", and is about four times the wall thickness. In some embodiments of the invention, the threads have a pitch of about six to ten times the wall thickness and a thread height of about three to five times the wall thickness. There does not appear to be a linear mathematical relationship between wall thickness, pitch and thread height. It is critical, however, that the convolutions be larger than the convolutions used in conventional helical tubing. The convolutions are preferably at least 25% larger in size for comparable diameter prior art tubing, and more preferably about 32% larger in size for comparable diameter prior art tubing tubing.

Within the parameters described above, a combination of pitch and thread height may be determined experimentally to achieve the desired axial compressibility. The preferred combination may vary depending on the type of elastomer used, the diameter of the tubing and the wall thickness. In some embodiments (e.g., 4" diameter butyl tubing), excellent results can be obtained when the product of the ratio of pitch to wall thickness (typically within the range of 6 to 10) and the ratio of thread height to wall thickness (typically within the range of 3-5) is 30±2.

FIG. 3 shows a portion of the length of tubing of FIG. 2, axially compressed to about 40% of its normal relaxed length (i.e., a tubing in which the relaxed length to compressed length ratio is about 2.5:1). At the same time, the tubing is flexible and resilient and has a high resistance to crushing. The amount of compressibility that may be obtained using the parameters described above may vary from about 20% to about 80%, and in some embodiments from about 50% to about 75%, shorter than its normal length upon application of a load of about 25 lbs. Thus, the ratio of a length of tubing in a normal relaxed state compared to a length of the same tubing in an axially compressed state will range from about 5:1 to about 1.25:1, and in some embodiments, from about 4:1 to about 2:1.

A typical embodiment of the invention is defined in the specifications listed in Tables I and II below:

TABLE I

| Type of Elastomer: | butyl rubber |
|---|---|
| Normal Relaxed Length: | 65.00" |
| Internal Diameter: | 3.75" |
| Wall Thickness: | 0.11" |
| Pitch: | 1.11" |
| Thread Height: | 0.422" |

TABLE II

| Axially Compressed Length: | 17.5" |
|---|---|
| Compression Ratio: | 3.171 to 1 (27%) |
| Force Required for Axial Compression: | 25 lbs. |
| Force Required to Maintain Compression: | 10 lbs. |

Figure 4:
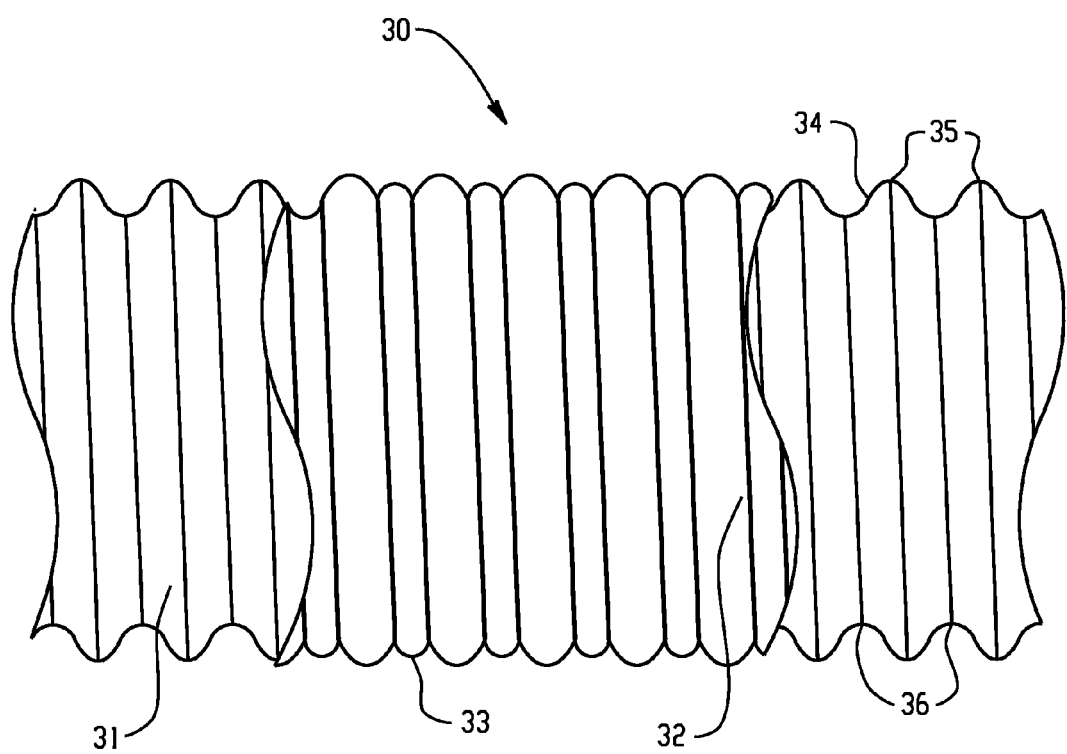
FIG. 4 is a fragmentary side elevation showing a sleeve of uncured rubber positioned on a forming mandrel with an outer surface defining a thread with helical convolutions formed in accordance with the invention, and further showing a cord wrapped around the sleeve to form helical corrugations, portions being broken away for the purpose of illustration.

The method of the invention incorporates a particular adaptation of the "cording" method described above. This particular adaptation is illustrated in FIG. 4 that shows a portion of an assembly 30 that includes a rotatable mandrel 31 with an uncured rubber sleeve 32 positioned thereon and formed into a helical corrugated shape using a length of cord 33 wrapped around the sleeve. The process is begun by sliding the uncured rubber sleeve 32 over the rotatable mandrel 31. The mandrel has a continuous thread 34 with a crest 35 and root 36, formed on its outer surface. The thread has a pitch of about six to ten times the wall thickness of the extruded sleeve and a thread height (from root to crest) of about three to five times the wall thickness. The preferred combination of pitch and thread height may be determined experimentally for a particular embodiment.

The sleeve 32 is forced into the helical root 36 of the mandrel 31 by wrapping the cord 33 around the sleeve as the sleeve rotates with the mandrel. This process forms helical convolutions in the uncured rubber sleeve 32.

The resulting assembly 30, a portion of which is shown in FIG. 4 is then removed from its rotary support and placed in a curing oven or autoclave where it is heated to cure the sleeve and set the helical corrugations. When curing is complete, the assembly 30 is removed from the oven and placed so that the mandrel is supported for rotation. Then the cord is removed from the cured rubber tubing by reverse rotation of the mandrel. Finally, the cured rubber tubing is removed from the mandrel such as by introducing air under pressure between the outer surface of the mandrel and the inner surface of the corrugated rubber tubing.

The resulting helically corrugated rubber tubing has a high resistance to crushing but also may be axially compressed using a small amount of force that may be easily applied by an average person. A typical amount of force required would be around 25 lbs. About 10 lbs of force is typically required to hold the tubing in its axially compressed condition.

While the invention has been shown and described with respect to specific embodiments thereof, this is intended for the purpose of illustration rather than limitation and other variations and modifications of the specific embodiments herein shown and described will be apparent to those skilled in the art, all within the spirit and scope of the invention. Accordingly, the patent is not to be limited in scope and effect to the specific embodiments shown and described nor in any other way that is inconsistent with the extent to which the progress in the art has been advanced by the invention.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A length of tubing comprising a flexible helically corrugated tube formed of an elastomeric material, said tube having a central axis and a wall of generally uniform thickness, wherein:
    the wall defines a continuous external thread with an external crest and an external root and a corresponding continuous internal thread,
    the external thread has a pitch within a range of six to ten times the thickness of the wall,
    the external thread has a thread height measured from the external crest to the external root within a range of three to five times the thickness of the wall,
    the tube has a normal relaxed linear length,
    the tube is compressible to an axial compressed linear length by a compression force not exceeding 25 pounds applied collinear to the central axis, and
    a ratio of the normal relaxed linear length to the axial compressed linear length is from about 5:1 to about 1.25:1.

2. The length of tubing according to claim 1, wherein the ratio of the normal relaxed linear length to the axial compressed linear length is from about 4:1 to about 2:1.

3. The length of tubing according to claim 2, wherein the compression force required to maintain the tube in the axially compressed linear length is 10 pounds or less.

4. The length of tubing according to claim 2, wherein the thickness of the wall is about 0.11 inches, the pitch of the external thread is about 1.11 inches, and the thread height of the external thread is about 0.42 inches.

5. The length of tubing according to claim 4, wherein the tube is formed of butyl rubber.

6. The length of tubing according to claim 1, wherein the tube is formed of butyl rubber.

7. The length of tubing according to claim 1, wherein the tube has an internal diameter in a diameter of from about 3 inches to about 6 inches.

8. The length of tubing according to claim 1, wherein the wall has a thickness of about 0.11 inches.

9. The length of tubing according to claim 8, wherein the pitch of the external thread is about 1.11 inches and the thread height of the external thread is about 0.42 inches.

10. The length of tubing according to claim 1, wherein the pitch of the external thread is from about 0.75 to about 1.25 inches and the thread height of the external thread is from about 0.25 to about 0.5 inches.

11. The length of tubing according to claim 10, wherein the tube is formed of butyl rubber.

* * * * *